United States Patent [19]
> Chrislock

[11] 4,135,412
[45] Jan. 23, 1979

[54] BACKLASH COMPENSATOR MECHANISM

[75] Inventor: Jerry L. Chrislock, Bethel Island, Calif.

[73] Assignee: The United States of America as represented by the United States Department of Energy, Washington, D.C.

[21] Appl. No.: 860,654

[22] Filed: Dec. 14, 1977

[51] Int. Cl.² ............................................. F16H 55/18
[52] U.S. Cl. ........................................ 74/441; 74/409
[58] Field of Search ................................... 74/441, 409

[56] References Cited
U.S. PATENT DOCUMENTS

| 2,615,348 | 10/1952 | Gasser | 74/441 |
| 2,916,931 | 12/1959 | Cunningham | 74/441 X |
| 2,919,596 | 1/1960 | Kuehl | 74/441 |
| 3,119,307 | 1/1964 | Opferkuch | 74/441 X |

Primary Examiner—Leonard H. Gerin
Attorney, Agent, or Firm—Dean E. Carlson; R. S. Gaither; L. E. Carnahan

[57] ABSTRACT

Mechanism which compensates for backlash error in a lead screw position indicator by decoupling the indicator shaft from the lead screw when reversing rotation. The position indicator then displays correct information regardless of the direction of rotation of the lead screw.

7 Claims, 4 Drawing Figures

BACKLASH COMPENSATOR MECHANISM

BACKGROUND OF THE INVENTION

The invention described herein was made at the Lawrence Livermore Laboratory in the course of, or under, Contact No. W-7405-ENG-48 between the United States Energy Reasearch and Development Administration (now the Department of Energy) and the University of California.

The invention relates to machine tools that position the workpiece or the tool by use of a lead screw, and more particularly to a machanism which compensates for backlash error in the lead screw.

Various types of machine tools that position the workpiece or the tool by use of the lead screw are known in the art. These machine tools are subject to the problem known as backlash error which is defined as the angle the screw rotates, when rotation is reversed, before it causes the table or workpiece to move. It is the "dead space" found when reversing rotation wherein the shaft rotates but the table or workpiece does not move. While lead screw position indicators (e.g. graduated dials) are used, such do not solve the problem of backlash.

Various types of mechanisms and methods have been utilized to overcome this backlash error problem in lead screw position indicators. For example, some indicators, either analog or digital, sense the position of the table by coupling to the shaft of the lead screw. For each fraction of rotation of the lead screw shaft, the indicator adds a proportionate amount to the indicator display. When the shaft is rotated in reverse, the indicator subtracts a proportionate amount from the accumulated total. However, due to backlash, the display is in error when the lead screw is rotated in reverse. Therefore, the operator is required to make all settings by approaching the set point from one direction. Thus a need exists for means to compensate for backlash error in lead screw position indicators.

SUMMARY OF THE INVENTION

The present invention compensates for backlash error so that the display will indicate the correct table position regardless of the direction of lead screw rotation. This invention applies to both direct-reading dials and to digital read-outs (electronic sensing).

Therefore, it is an object of this invention to provide a backlash compensator mechanism for machine tools.

A further object of the invention is to provide a mechanism which compensates for backlash error in a lead screw position indicator of a machine tool that positions the workpiece or the tool by use of a lead screw.

Another object of the invention is to provide means which compensates for backlash error in a lead screw position indicator by decoupling the indicator shaft from the lead screw when reversing rotation, whereby the position indicator then displays correct information regardless of the direction of rotation of the lead screw.

Another object of the invention is to provide a backlash compensating mechanism which is adjustably coupled to the position indicator of a lead screw after the lead screw rotates to the point that the backlash is taken up.

Other objects of the invention will become readily apparent from the following description and the accompanying drawings.

DETAILED DESCRIPTION OF THE INVENTION

The present invention is for use with machine tools that position the workpiece or the tool by use of a lead screw. The invention constitutes a mechanism which compensates for backlash error in a lead screw position indicator by decoupling the indicator shaft from the lead screw when reversing rotation. The position indicator then displays correct information regardless of the direction of rotation of the lead screw.

Figure 1:
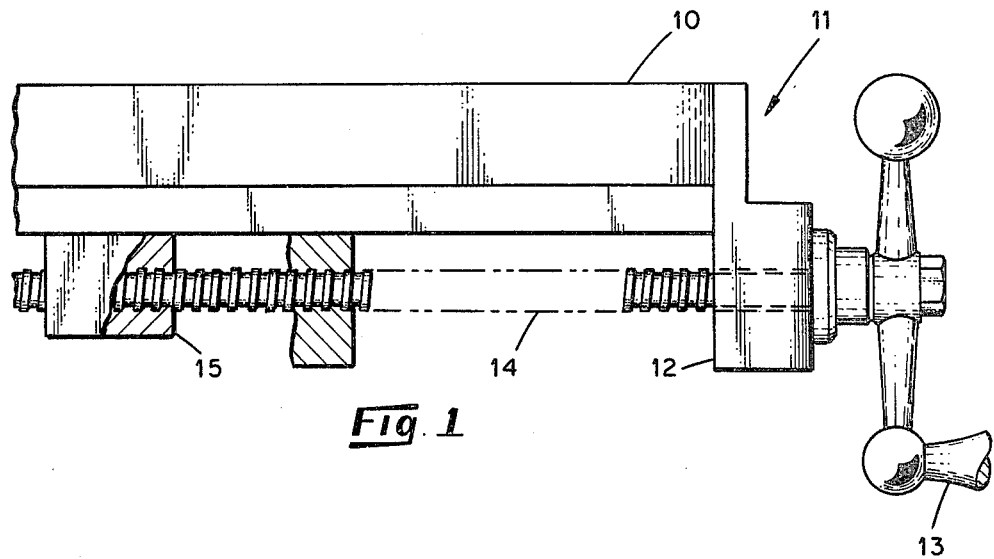
FIG. 1 is a view, partially in cross-section is an embodiment of a machine tool on which the invention may be utilized.
Figure 2:
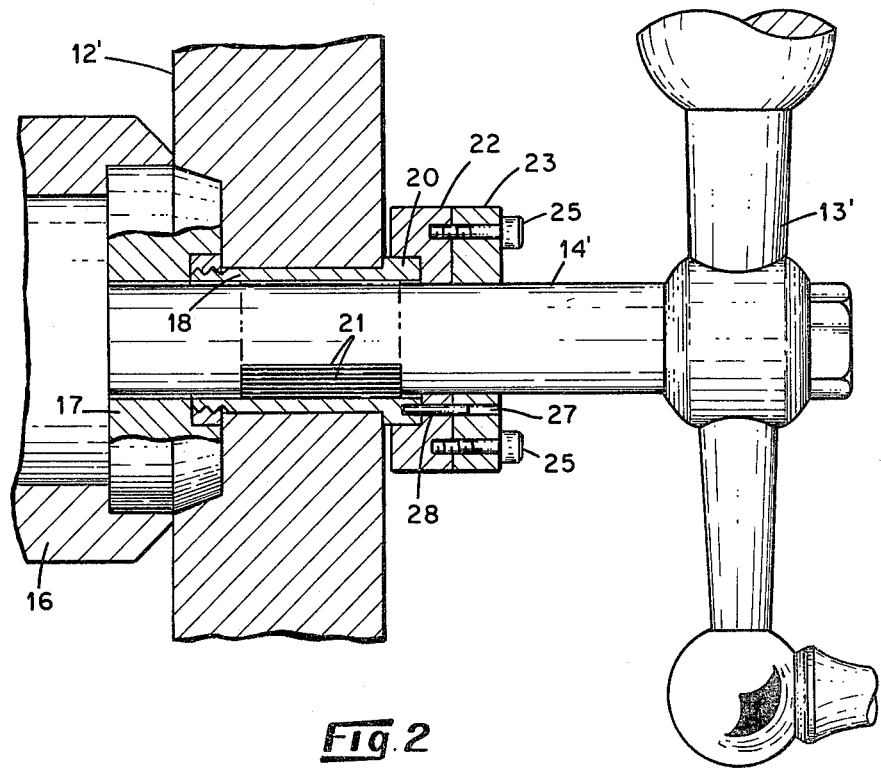
FIG. 2 illustrates an embodiment, partially in cross-section of an assembled backlash compensator mechanism in accordance with the invention.
Figure 3:
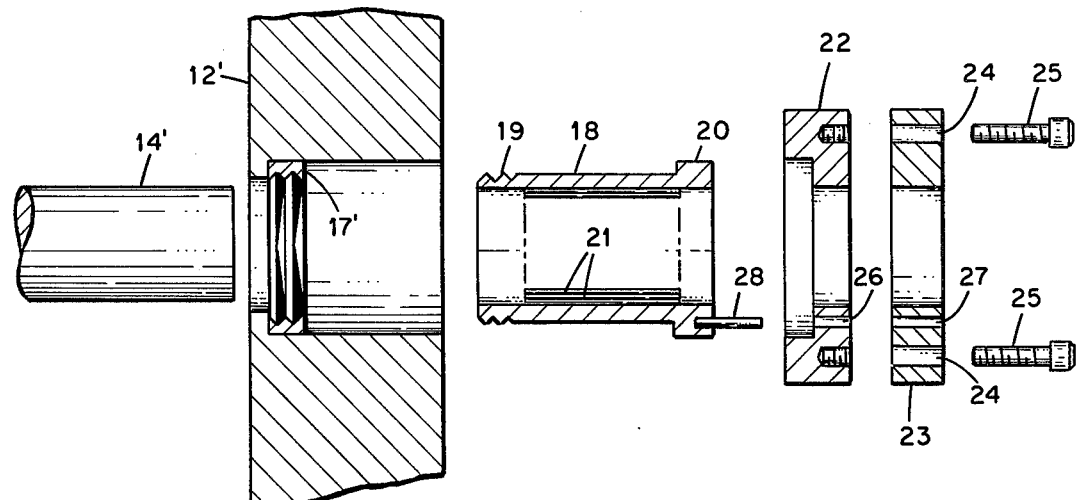
FIG. 3 is an exploded view, partially in cross-section, of the FIG. 2 mechanism.
Figure 4:
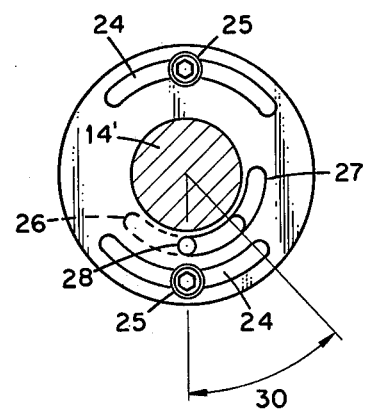
FIG. 4 is a front view of the FIG. 2 mechanism with the lead screw shaft in cross-section.

Referring now to the drawings, FIG. 1 illustrates an example of a machine tool on which the invention may be utilized, while FIGS. 2–4 illustrate the backlash compensator mechanism of the invention. For example, as shown in FIG. 1, a table 10 of a Bridgeport milling machine, generally indicated at 11, is provided with a position indicator 12 and is moved by cranking handle 13 which rotates a lead screw 14, while a stationary nut 15 engages the lead screw 14 causing the table 10 to move. Backlash error is defined as the angle the lead screw 14 rotates, when rotation is reversed, before it engages the nut 15 again. It is the "dead space" found when reversing rotation wherein the lead screw rotates but the table 10 does not move.

The mechanism of FIGS. 2–4 compensates for the backlash error or "dead space". As shown, handle 13' is directly coupled to lead screw shaft 14' which, by its threaded portion (not shown), drives the table, as in FIG. 1. The position indicator 12' is mounted upon, but not fastened to, the lead screw shaft 14' via a support member 16 which supports an internally threaded collar 17. As shown in FIG. 3, a threaded collar 17' may be formed integrally within indicator 12' and the support member 16 omitted. A sleeve, spool or hollow member 18, having threads 19 at one end and a flange 20 at the opposite end (see FIG. 4) extends into and is secured within indicator 12' via the threaded collar 17 and threads 19 of spool 18. Sleeve 18 is provided on the inner surface with needle bearings 21 to provide for friction free rotation of lead screw shaft 14' therein. A collar 22 is fixedly fastened to the lead screw shaft 14' by means such as set screws, keyways, etc., not shown. Another collar 23 having a pair of slots 24 (see FIG. 4) is fastened to collar 22 by adjustment screws 25 as shown in FIGS. 2 and 3. Each of collars 22 and 23 are provided with slots 26 and 27, respectively, which are only partially aligned with one another as indicated in FIG. 4. Slots 24, 26 and 27 are configured in an arcuate shape with slot 27 being angularly offset with respect to slots 24. A pin 28 extends through slots 26 and 27, see FIG. 2, and is secured at one end to the flange 20 of sleeve 18. The purpose of the two collars is to provide a means for adjusting a slot length formed by the coincidence of slots 26 and 27. To adjust the slot length, screws 25 loosened allowing collar 23 to be rotated to a new position where screws 25 are then lightened. Then adjustable slots 24, 26 and 27 allows the backlash compensator of this invention to be custom-fitted to the backlash of the lead screw in question.

In operation, the lead screw shaft 14' drives collars 22 and 23. The slots 26 and 27 in the collars are positioned to drive pin 28 which drives sleeve 18 and the attached position indicator 12'. When rotation of shaft 14' reverses, collars 22 and 23 will not drive pin 28 until the collars have rotated so that pin 28 is at the other end of the slot formed by aligned sections of slots 26 and 27. Beyond that point the lead screw shaft 14' again drives the position indicator 12'. If, as shown in FIG. 4, the angle 30 defined by the slot is equal to the backlash error of the lead screw shaft 14', then the position indicator 12' is exactly compensated for backlash error and is accurate for either direction of lead screw shaft rotation. The angle 30 is adjusted by adjusting the position of collar 34 with respect to collar 22 via slots 24 and adjustment screws 25.

It has thus been shown that the present invention provides a backlash compensator mechanism which is structurally simple and provides accurate position display information for either direction of lead screw movement, which results in fast and more convenient machine tool operation.

While a particular embodiment of the invention has been illustrated and described, modifications will become apparent to those skilled in the art, and it is intended to cover in the appended claims all such modifications that come within the spirit and scope of the invention.

What I claim is:

1. In a machine tool that positions the workpiece or the tool by movement of a lead screw shaft and having a lead screw shaft position indicator, the improvement comprising means for compensating for backlash error in a lead screw shaft position indicator: said backlash compensating means consisting of a hollow member positioned about a lead screw shaft and secured to said position indicator; a first collar means fixedly secured to said lead screw shaft and positioned closely adjacent said hollow member, said first collar means having slot therein; a second collar means movably secured to said first collar means, said second collar means having a slot positioned to partially align with said slot of said first collar means and a pair of slots located radially outward from said slot; and pin means secured at one end to said hollow member and extending through a slot formed by coincidence of said partially aligned slots of said first and second collar means, such that movement of said lead screw shaft drives said first and second collar means which causes said pin means to drive said hollow member and the attached position indicator, and upon reversal of rotation of said lead screw shaft said collar means are not driven until said collar means have rotated so that said pin means is at an opposite end of the slot formed by said partially aligned slots and beyond which the lead screw shaft again drives said position indicator, thereby compensating for backlash error in the lead screw shaft position indicator.

2. The improvement defined in claim 1, wherein said hollow member comprises a sleeve threaded at one end and having a flange at the opposite ends said threaded end being secured to said position indicator, said sleeve being provided with bearing means on an inner surface thereof, and wherein said pin means is secured to said flange.

3. The improvement defined in claim 2, wherein said first collar means includes an outwardly extending flange section, said flange section being positioned around said flange of said sleeve, and wherein said slot has an arcuate configuration.

4. The improvement defined in claim 3, wherein each of said slots in said second collar means has an accurate configuration.

5. The improvement defined in claim 4, wherein each of said slots in said second collar means are of an accurate configuration, and wherein said first mentioned slot in said second collar means being angularly offset with respect to said pair of slots therein.

6. The improvement defined in claim 2, additionally including an internally threaded collar means secured to said position indicator, said threaded end of said sleeve being threadedly attached to said internally threaded collar means.

7. The improvement defined in claim 1, additionally including a collar means secured to said position indicator, and means for supporting said collar means.

* * * * *